United States Patent [19]

Kuczkowski

[11] 4,124,565
[45] Nov. 7, 1978

[54] N,N'-DISUBSTITUTED-P-PHENYLENEDIA-MINES

[75] Inventor: Joseph A. Kuczkowski, Cuyahoga Falls, Ohio

[73] Assignee: The Goodyear Tire & Rubber Company, Akron, Ohio

[21] Appl. No.: 803,703

[22] Filed: Jun. 6, 1977

[51] Int. Cl.$^2$ .......................... C08K 5/36; C07C 87/62
[52] U.S. Cl. ............................ 260/45.9 QB; 260/804; 260/809; 260/571; 260/576
[58] Field of Search ................ 260/45.9 QB, 804, 809, 260/571, 576

[56] References Cited

U.S. PATENT DOCUMENTS

| 3,000,852 | 9/1961 | Merz | 260/45.9 QB |
|---|---|---|---|
| 3,035,014 | 5/1962 | Popoff et al. | 260/45.9 QB |
| 3,217,038 | 11/1965 | Guarnaccio et al. | 260/576 |
| 3,423,327 | 1/1969 | Tracy | 260/45.9 QB |

OTHER PUBLICATIONS

Polymer Stabilization, by Hawkins, Wiley Interscience Pub., NYC, 1972, pp. 55 to 63.
Atmospheric Oxidation and Antioxidants, by Scott, Elsevier Press, NYC, 1965, pp. 494 to 511.
J. Organic Chemistry, vol. 28, (Oct. 1963) pp. 2763 to 2765.
J. Organic Chemistry, vol. 30, (Jan. 1965) pp. 28 to 33.

*Primary Examiner*—V. P. Hoke
*Attorney, Agent, or Firm*—D. B. Little

[57] ABSTRACT

N,N'-disubstituted-p-phenylenediamines, wherein one of the substituents is a R-thiomethylphenyl moiety, are produced by a reaction of thiols, formaldehyde, and an N-phenyl-p-phenylenediamine in the presence of an acid. These compounds are antioxidants and antiozonants in rubber compounds.

5 Claims, No Drawings

N,N'-DISUBSTITUTED-P-PHENYLENEDIAMINES

BACKGROUND OF THE INVENTION

This invention relates to N,N'-disubstituted p-phenylenediamines which offer protection to polymers such as natural rubber against the deleterious effects of oxygen and ozone. It also relates to methods for preparation and use of these materials and to the compositions formed by mixing these materials with polymers.

Para-phenylenediamines have been used in the past as antioxidants or antiozonants. Some of the patents disclosing such compounds are mentioned below.

N-alkyl-N'-phenyl-p-phenylenediamines are revealed in U.S. Pat. Nos. 3,409,586; 3,424,713; 3,542,691; 3,663,505; and 3,839,275; British Pat. No. 1,035,262; Canadian Pat. Nos. 650,411; 643,839; 609,732; and 882,785; and Australian Pat. No. 285,141.

N,N'-diaryl-p-phenylenediamines are the subject of the following U.S. Pat. Nos.: 3,432,460; 3,510,518 and 3,785,995; British Pat. Nos. 1,047,278; and 1,136,830; and Canadian Pat. No. 789,078.

Sulfur-containing para-phenylenediamines are disclosed in U.S. Pat. No. 3,035,014.

The one-step acid catalyzed reaction between thiols, formaldehyde and aromatic amines is known in the prior art, see P.T.S. Lau and G. F. Grillot, *J. Org. Chem.*, 28, 2763 (1963); *J. Org. Chem.*, 30, 28 (1965); and G. F. Grillot and R. E. Schaffrath, *J. Org. Chem.*, 24, 1035 (1959).

SUMMARY OF THE INVENTION

The present invention has as its objects: (1) to provide a new type of N,N'-disubstituted-p-phenylenediamine for the protection of polymers against degradation by ozone and oxygen; (2) to provide polymers stabilized against ozone and oxygen attack; and (3) to provide a process of preparing said N,N'-disubstituted-p-phenylenediamines.

Other objects will become apparent as the description proceeds.

The invention pertains to compounds having the following formula:

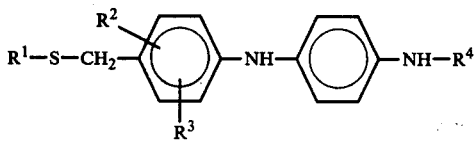

wherein $R^1$ is selected from the group consisting of normal alkyl radicals having 1 to 20 carbon atoms (1-20C), aryl radicals (6-14C), substituted normal alkyl radicals (2-20C), substituted aryl radicals (6-14C), and aralkyl radicals (7-15C).

The term "substituted" as used herein means having attached at one or more of the carbon atoms one or more radicals such as Cl, Br, OH, $CH_3$, CN, and $C_4H_9$ but not limited to these specific examples. $R^1$, when it is a substituted alkyl radical, can be, for example, (2-cyano) ethyl, 2-hydroxyethyl, carbomethoxyethyl or carboethoxymethyl. $R^1$, when it is an aralkyl radical, can be, for example, benzyl, p-chlorobenzyl, vinylbenzyl, p-carbomethoxybenzyl, p-hydroxybenzyl, or p-n-hexoxybenzyl. $R^1$ when it is a substituted aryl radical, can be, for example, p-chlorophenyl, p-bromophenyl, p-hydroxyphenyl, tolyl, p-tert. butylphenyl, p-methoxyphenyl, p-ethoxyphenyl, pentachlorophenyl or carboethoxyphenyl.

$R^2$ and $R^3$ are selected from the group consisting of H, alkyl radicals (1-8C), aryl radicals (6-14C), aralkyl radicals (7-15C) and halogen radicals such as Br and Cl, and $R^4$ is selected from the group consisting of alkyl radicals (1-18C), aryl radicals (6-14C), and

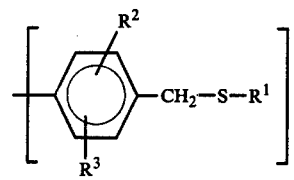

where $R^1$, $R^2$ and $R^3$ are as defined above.

The compounds of this invention are used to stabilize polymers against degradation by oxygen and ozone.

DESCRIPTION OF THE PREFERRED EMBODIMENTS

The compounds of this invention can be prepared by the acid catalyzed reaction between a suitable thiol, formaldehyde, and an N-phenyl-N'-alkyl-p-phenylenediamine or N,N'-didiphenyl-p-phenylenediamine in an alcohol solution.

The ingredients are mixed and refluxed for a certain period normally varying between 1 to 24 hours. The best reflux times are normally from 15 to 24 hours.

After sufficient refluxing, the reaction mixture is cooled and its pH is adjusted to basic under which condition the product may be separated and thereafter purified.

The reaction proceeds most effectively with equivalent mole amounts of thiol, formaldehyde and N-phenyl-N'-alkyl-p-phenylenediamine, or N,N'-diphenyl-p-phenylenediamine, although other molar ratios can be used in the case of N,N'-diphenyl-p-phenylenediamine leading to disubstituted product.

The three reactants and acid may be mixed at the same time or the acid may be added some time after refluxing of the reaction mixture has started. A preferred method is that in which the acid is added after refluxing has been in progress. The preferred time for refluxing prior to acid addition is 1½ hours.

The thiols useful in this process have the structure $R^1SH$ where $R^1$ is as defined previously. Preferably, when $R^1$ is a substituted alkyl or aryl radical, it is monosubstituted, and the substituent is a radical selected from the group consisting of Cl, Br, OH, CN, carbomethoxy, and carboethoxy.

Examples of the thiols which can be used in this preparation are: thiophenol, benzylthiol, n-octane thiol, n-dodecanethiol, p-chlorothiophenol.

The N-phenyl-p-phenylenediamines which can be used have the structure

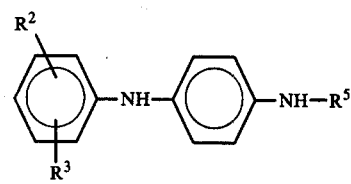

where $R^5$ is selected from the group consisting of

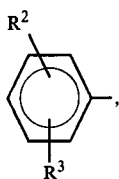

alkyl radicals (1–18C), and aryl radicals (6–14C). Some examples are:

N,N'-diphenyl-p-phenylenediamine;
N-phenyl-N'-(1,3-dimethylbutyl)-p-phenylenediamine;
N-phenyl-N'-p-chlorophenyl-p-phenylenediamine;
N-phenyl-N'-p-hydroxyphenyl-p-phenylenediamine.

In the case of N,N'-diphenyl-p-phenylenediamine, the product may be disubstituted with two thiomethyl groups, i.e. symmetrical. The thiol and formaldehyde can react at two sites on the N,N'-diphenyl-p-phenylenediamine, 4 and 4'. The result is a bis thiomethylphenyl compound such as N,N'-bis (p-phenylthiomethylphenyl)-p-phenylenediamine. In the case of such disubstitution, the molar ratio of reactants should be 2 moles of formaldehyde to 2 moles of thiol to 1 mole of N,N'-diphenyl-p-phenylenediamine. Other mole ratios between 2:2:1 and 1:1:1000 may be used to produce a mixture of products.

The acids which may be used are those having an available hydrogen and are illustrated by but not limited to hydrochloric acid, sulfuric acid and hydrobromic acid. The preferred amount of acid is an amount equimolar with the p-phenylenediamine. However, the molar ratio of acid to p-phenylenediamine can range from 1/1 or less to 5/1 or more. The criterion is that the reaction media is acidic.

The alcohols which have been used, along with the reflux temperature for each is given in Table 1.

Table 1

| Alcohol | Reflux Temperature in ° C. |
| --- | --- |
| Methanol | 64.9 |
| Ethanol | 78.5 |
| 1-propanol | 97.1 |
| 1-butanol | 117.5 |

The following list of compounds illustrates but does not limit the compounds of this invention:

1. N,N'-bis(p-phenylthiomethylphenyl)-p-phenylenediamine.
2. N,N'-bis(n-octylthiomethylphenyl)-p-phenylenediamine.
3. N,N'-bis(n-dodecylthiomethylphenyl)-p-phenylenediamine.
4. N,N'-bis(p-chlorophenylthiomethylphenyl)-p-phenylene-diamine.
5. N-(p-phenylthiomethylphenyl)-N'-(1,3-dimethylbutyl)-p-phenylenediamine.
6. N-(n-octylthiomethylphenyl)-N'-(1,3-dimethylbutyl)-p-phenylenediamine.
7. N-(n-dodecylthiomethylphenyl)-N'-(1,3-dimethylbutyl)-p-phenylenediamine.
8. N-(p-phenylthiomethylphenyl)-N'-phenyl-p-phenylenediamine.

All of the above eight compounds have been synthesized by the technique described herein.

The following working examples illustrate but do not limit the process for preparation of the compounds of this invention. Unless otherwise stated, percentages are weight percent and parts are parts by weight.

The examples indicate which of the compounds from the list above is being synthesized, but it must be pointed out that the products yielded are not pure. The tars and oils which have been isolated are believed to be mixtures comprised of the product indicated, unreacted p-phenylenediamine, and (in the case of the bis products) compounds with only one R-thiomethylphenyl substituent. Further separation of one discrete chemical compound from the mixture is not critical to this invention.

EXAMPLE I

Compound 7

A mixture of 40 grams (0.198 mole) of n-dodecane thiol, 55 grams (0.206 mole) of N-phenyl-N'-(1,3-dimethyl-butyl) paraphenylenediamine and 17 milliliters of 37 percent formalin (0.209 mole) was prepared in 250 milliliters of 95 percent ethanol. This was kept at reflux for 2 hours. To this solution at reflux was added 16 milliliters of concentrated HCl. The reflux was continued overnight. This was then cooled in ice and a 20 percent solution of KOH was added until the reaction mixture was made basic. The reaction yielded a dark oil and an aqueous layer. Chloroform was added to the reaction product and the aqueous layer was decanted. The chloroform layer was washed with 10 percent potassium hydroxide solution. The chloroform solution was then dried over sodium sulfate and filtered. On flash evaporation there was deposited 91 grams of product as an oil (95.5 percent yield).

EXAMPLE II

Compound 6

A mixture of 30 grams (0.205 mole) of n-octanethiol, 55 grams (0.206 mole) of N-phenyl-N'-(1,3-dimethylbutyl) paraphenylenediamine and 17 milliliters of 37 percent formalin (0.209 mole) was prepared in 150 milliliters of 95 percent ethanol. This was refluxed for 2 hours and then 16 milliliters of concentrated HCl was added. The reflux was continued for 70 hours. This reaction solution was then cooled to room temperature and the acid neutralized by the addition of 20 percent KOH solution. The reaction mixture was extracted with chloroform. The organic layer was collected washed with water and dried over sodium sulfate. On flash evaporation there was deposited 76 grams of a black oil (87.2 percent yield).

EXAMPLE III

Compound 2

A mixture of 30 grams (0.205 mole) of n-octanethiol 26 grams (0.100 mole) of N,N'-diphenylparaphenylenediamine and 17 milliliters of 37 percent (0.209 mole) of formalin was prepared in 150 milliliters of 95 percent ethanol. This was refluxed 1 hour and then 18 milliliters of concentrated HCl was added. Reflux was continued for 4 hours. On cooling a black gum formed. The liquid layer was decanted and the gum was dissolved in chloroform (200 milliliters) a 10 percent solution of KOH was added until the aqueous layer tested basic. An emulsion formed which was broken by adding 200 milliliters of saturated sodium chloride solution. The organic layer was collected washed with water and dried over sodium sulfate. On flash evaporation there was deposited 47 grams of a dark black oil (yield 81.5 percent).

EXAMPLE IV

Compound 1

A mixture of 26 grams (0.100 mole) of N,N'-diphenyl-paraphenylenediamine, 22 grams (0.200 mole) of benzenethiol and 17 milliliters of 37 percent formalin (0.209 mole) was prepared in 150 milliliters of 95 percent ethanol and refluxed for 1 hour. To this at reflux was added 18 milliliters of concentrated HCl. Reflux was continued 5 additional hours and then stopped. The reaction mixture was cooled in ice and a black gum formed. The aqueous layer was poured off and the gum was dissolved in chloroform. A 10 percent solution of KOH was added to render the reaction basic. The organic layer was collected washed with water and then dried over sodium sulfate. This was then flash evaporated to deposit a black tar (yield 39 grams 75.8 percent).

Polymers that may be protected by the compounds described herein are vulcanized and unvulcanized polymers susceptible to degradation by oxygen and ozone, such as natural rubber, balata, gutta percha, and rubbery synthetic polymers such as polyisoprene, polybutadiene, styrene-butadiene rubber, acrylonitrile-butadiene rubber, and blends of the above.

Although the precise amount of antioxidant to be used depends upon the particular polymer and conditions to which it will be exposed, generally the amount employed for antioxidant and antiozonant purposes varies between 0.1 and 10 parts per 100 parts of polymer. The preferred range for use is 1 to 6 parts per 100 parts of rubber.

The following experimental data is presented to illustrate but not to limit the use of the compounds of the present invention as antioxidants and antiozonants.

Compounds 1 through 7 were each used to stabilize an SBR polymer (1006) by addition to a benzene solution of SBR-1006 at a concentration of 1 part per 100 parts rubber. Oxygen absorption tests were made on the films obtained by evaportion of the benzene. The testing procedure is of the type described in further detail in *Industrial and Engineering Chemistry*, Vol. 43, page 456 (1951) and *Industrial and Engineering Chemistry*, Vol. 45, p. 392 (1953).

Table 2

| Compound | Hours to Absorb 1% Oxygen at 100° C. - SBR-1006 |
|---|---|
| 1 | 252 |
| 2 | 250 |
| 3 | 200 |
| 4 | 283 |
| 5 | 364 |
| 6 | 348 |
| 7 | 342 |
| Commercial Antioxidant #1 | 384 |

Table 2-continued

| Compound | Hours to Absorb 1% Oxygen at 100° C. - SBR-1006 |
|---|---|
| Commercial Antioxidant #2 | 366 |

Had no antioxidant been present, the SBR would have absorbed 1.0 percent $O_2$ in 5 to 10 hours. All of the experimental materials exhibited antioxidant activity.

Rubber ozone resistance is measured by exposure of cured flat strip samples of rubber compound to an atmosphere containing 50 pphm (parts by volume per hundred million) ozone concentration. This is referred to as the ozone box test. The various modes of testing include the use of original samples, preaged. samples, static, and dynamic conditions. In each case, the sample is under some stress such as by elongation or bending in a loop.

Ozone attack is evidenced by cracks in the sample. Test results are reported by use of a code X/Y wherein X corresponds to crack density and Y corresponds to crack severity. An X of 1 means less than ⅓ of the surface is cracked, 2 corresponds to ⅓ to ⅔ of the surface, 3 corresponds to ⅔ to ¾ cracked, and 4 means greater than ¾ of the surface is covered with cracks. A Y of ½ signifies cracks less than 0.01 inch in length, 1 means they are 0.01 to 0.02 inches long, and values increase progressively with increasing crack length up through a Y of 10 which corresponds to cracks 0.25 inches long and longer.

Roof exposure is also used to test the resistance of samples of ozone attack and weathering. Samples are aged for a given length of time and compared using the data reporting system for cracking described previously. Samples can be original or preaged 24 or 48 hours at 212° F. and are generally under some stress such as by elongation. They may also be under repeated flexing during daylight hours. This dynamic roof test is the most indicative of a chemical antiozonant's value. Roof aging is carried out in Akron, Ohio where 6 pphm is the average atmospheric ozone concentration.

The flex test measures antiozonant benefit by repeatedly stretching a sample a predetermined amount (e.g. 66% elongation). Minutes to breaking are recorded.

The test shock used to evaluate the chemicals of this invention was a tire sidewall type compound of the following composition:

| | Parts |
|---|---|
| Synthetic polyisoprene rubber | 40.00 |
| Synthetic polybutadiene rubber | 30.00 |
| Synthetic SBR rubber | 41.25 |
| Tackifying resin | 3.00 |
| Process oil | 8.00 |
| Zinc oxide | 5.00 |
| Stearic acid | 2.00 |
| Antiozonant | 4.00 |
| Carbon black | 50.00 |
| Sulfur | 2.82 |
| 4-Morpholinyl-2-benzothiazole disulfide | 1.50 |

Results of ozone testing of compounds 5, 6 and 7 appear in Table 3:

Table 3

| Test | No Antiozonant | Commercial Antioxonant | Compound 5 | Compound 6 | Compound 7 |
|---|---|---|---|---|---|
| 66% Flex at 75° F. (Average of 4): | | | | | |
| Min. to Fail | 63 | 41 | 71 | 111 | 77 |
| 66% Flex at 200° F. (Average of 4): | | | | | |
| Min. to Fail | 18 | 30 | 12 | 35 | 36 |
| Ozone Box 50 PPHM 100° F.: | | | | | |

Table 3-continued

| Test | No Antiozonant | Commercial Antioxonant | Compound 5 | Compound 6 | Compound 7 |
|---|---|---|---|---|---|
| 22% Original Dynamic Average | 4/7 | 4/1 | 4/1 | 4/3-4 | 4/3 |
| 22% Pre-Aged 48 hours at 212° Dynamic Average | 4/7 | 4/4 | 4/4 | 4/5-6 | 4/6 |
| Roof Agings: | | | | | |
| Dynamic Original Rating (54 DA) | 4/2 | 2-3/.5-1 | 2-3/.5-1 | 4/.5-1 | 4/1 |
| Dynamic Pre-Aged 48 hours at 212° F. Rating (54 DA) | 4/1* | 4/1 | 4/1* | 4/1* | 4/1* |
| Static Original Rating (172 DA) | 4/6 | 0 | 0 | 0** | 0** |
| Static Pre-aged 48 hours at 212° F. Rating (172 DA) | 4/3-5* | 0* | 0* | 0* | 0* |

*Sample broke during test.
**Edge cracks.

All three experimental materials exhibited antiozonant activity, compound 5 being about equivalent to the commercial product in every case. All three also performed better in the flex test than the commercial antiozonant, except compound 5 at 200°F.

While certain representative embodiments and details have been shown for the purpose of illustrating the invention, it will be apparent to those skilled in this art that various changes and modifications may be made therein without departing from the spirit or scope of the invention.

What is claimed is:

1. A compound having the following structural formula:

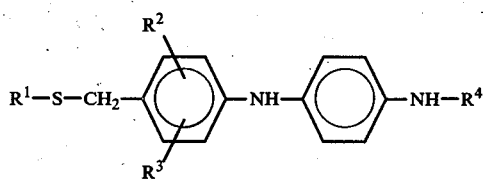

wherein $R^1$ is selected from the group consisting of normal-alkyl radicals (1–20C), aryl radicals (6–14C), substituted normal alkyl radicals (2–20C), substituted aryl radicals (6–14C), and aralkyl radicals (7–15C); $R^2$ and $R^3$ are selected from the group consisting of H, alkyl radicals (1–8C), aryl radicals (6–C), aralkyl radicals (7–15C), and halogen radicals; and $R^4$ is selected from the group consisting of alkyl radicals (1–18C), aryl radicals (6–14C) and

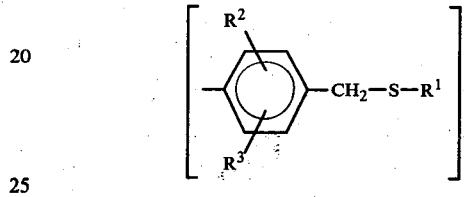

2. The compound of claim 1 wherein $R^1$ is selected from the group consisting of phenyl, n-octyl, n-dodecyl and chlorophenyl; and $R^4$ is selected from the group consisting of 4-phenylthiomethylphenyl, 4-n-octylthiomethylphenyl, 4-p-chlorophenylthiomethylphenyl, 1,3-dimethylbutyl, and phenyl.

3. A polymer selected from the group consisting of natural rubber, polybutadiene rubber, polyisoprene rubber, styrene butadiene rubber (SBR), blends of SBR and natural rubber, blends of SBR polyisoprene rubber and polybutadiene rubber, and blends of natural rubber and polybutadiene rubber having incorporated therein having a stabilizng amount of a compound of claim 1.

4. A polymer selected from the group consisting of natural rubber, polybutadiene rubber, polyisoprene rubber, styrene butadiene rubber, blends of SBR and natural rubber, blends of SBR, polyisoprene rubber, and polybutadiene rubber, and blends of natural rubber of polybutadiene rubber having incorporated therein from 1 to 6 parts by weight of a compound of claim 1 per 100 parts of rubber.

5. A polymer selected from the group consisting of natural rubber, polybutadiene rubber, polyisoprene rubber, styrene butadiene rubber, blends of SBR and natural rubber, blends of SBR, polyisoprene rubber, and polybutadiene rubber, and blends of natural rubber and polybutadiene rubber having incorporated therein from 1 to 6 parts by weight of a compound of claim 2 per 100 parts of rubber.

* * * * *